W. O. SMYTH.
BRICKLAYER'S GAGE LINE.
APPLICATION FILED JUNE 26, 1912.

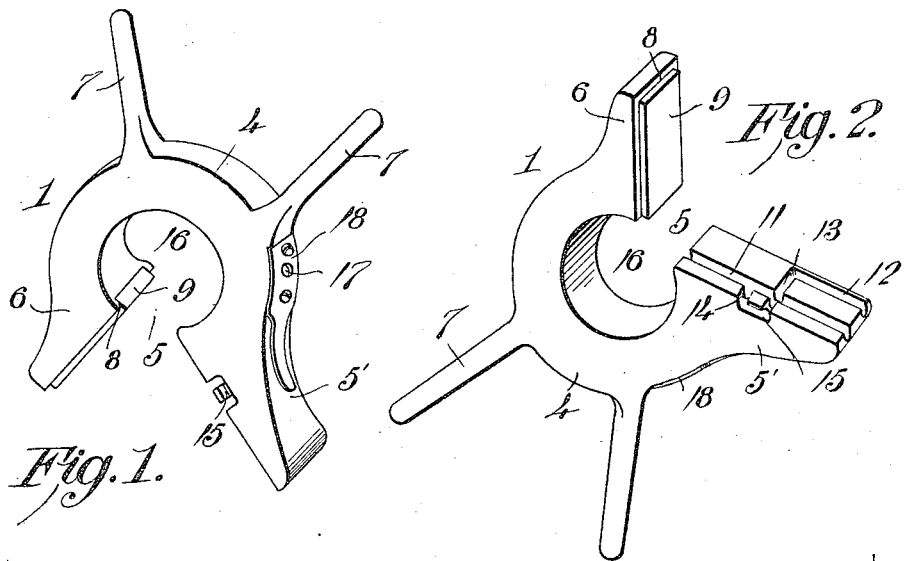

1,075,166.

Patented Oct. 7, 1913.
2 SHEETS—SHEET 2.

Witnesses
Carroll Bailey.
P. M. Smith.

Inventor
William O. Smyth
By Victor J. Evans
Attorney

UNITED STATES PATENT OFFICE.

WILLIAM O. SMYTH, OF BRILLIANT, OHIO.

BRICKLAYER'S GAGE-LINE.

1,075,166.     Specification of Letters Patent.     Patented Oct. 7, 1913.

Application filed June 26, 1912. Serial No. 705,996.

*To all whom it may concern:*

Be it known that I, WILLIAM O. SMYTH, a citizen of the United States, residing at Brilliant, in the county of Jefferson and State of Ohio, have invented new and useful Improvements in Bricklayers' Gage-Lines, of which the following is a specification.

This invention relates to bricklayers' gage lines, the object in view being to provide a combination device, embodying a line, line blocks, twig holders, and bay spikes, the device being especially designed for the use and convenience of masons, who may readily and accurately shift the line from place to place, as required, while obtaining the greatest possible accuracy in the positioning of the line which governs the progressive laying of the tiers of bricks or building blocks, the device assisting also materially in plumbing or lining up the corners of the structure.

A further object of the invention is to so combine the several parts of the device that they are all interconnected and therefore not subjected to loss, should any part of the device become dislodged from its place, through inadvertence or carelessness on the part of any of the workmen.

With the above and other objects in view, the invention consists in the construction, combination and arrangement of parts, as will be hereinafter more fully described, illustrated in the accompanying drawings, and pointed out in the claims hereunto appended.

Figure 5:
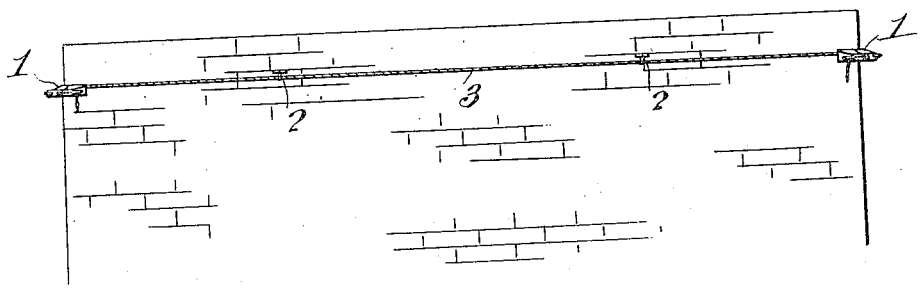
Figure 6:
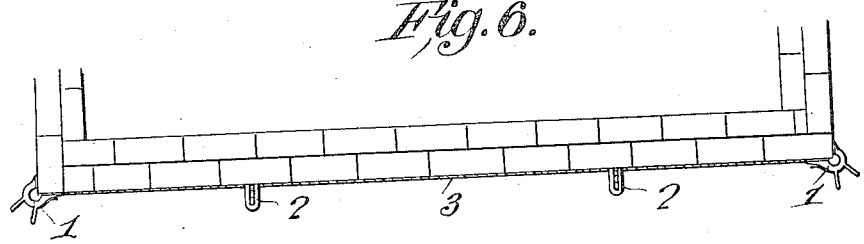
Figure 7:
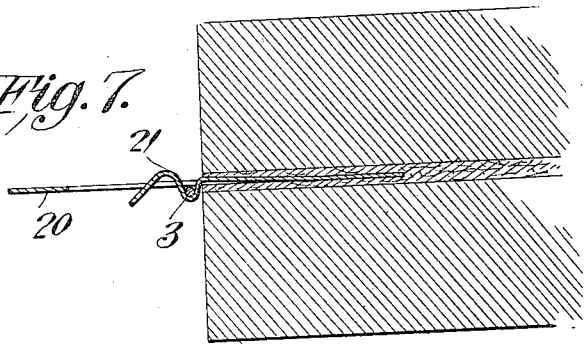

In the drawings: Figure 1 is a perspective view of a line block, showing the cord gripping spring. Fig. 2 is a similar view taken from another point, showing the angular contacting faces of the arms of the block. Fig. 3 is a horizontal section through the block, showing the line in place. Fig. 4 is a perspective view of one of the twig or line holders. Fig. 5 is a front elevation of a section of masonry showing the device, as a whole, in place. Fig. 6 is a plan view of the same. Fig. 7 is a vertical cross section through the same, taken in line with one of the twig holders. Fig. 8 is a plan view similar to Fig. 6, showing the use of the bay spikes. Fig. 9 is a detail perspective view of one of the bay spikes.

The device in its entirety embodies a pair of line blocks 1, any suitable number of twig holders 2, and a line or cord 3 which is connected at its opposite ends to the blocks, and also connected at intermediate points to the twig holders. Each block comprises a substantially circular body portion 4 which is split or divided at the point 5, and extended to form two arms 5' and 6 arranged at right angles to each other. Opposite the arms 5' and 6, radially extending pegs 7 are provided, upon which the surplus of the line is adapted to be wrapped, when not in use, to avoid the dangling of the free or unused end of the line, while the workmen are engaged.

The arm 6 is provided with a recess 8 in its contacting face, and an insert 9 of leather, rubber, or other soft material is secured in said recess, said insert providing a friction holding surface which is not apt to slide when placed in contact with the end or corner brick of a row or tier. The other or longer arm 5 of the block is provided in its face with a line groove 11 extending lengthwise thereof, and adapted to receive the line 3 referred to. In the same face of the block, there is provided another groove 12 extending lengthwise of the block, and arranged near the top edge of the arm 5, so as to bring the line up to a level with the top edge of the completed tier of bricks, previously laid. This especially adapts the block also for use in finishing up a wall, adjacent to the cornice. In addition to the grooves 11 and 12, a cross groove 13 is provided, which intersects the grooves 11 and 12, so as to enable the line to be carried across the face of the block, as shown in Figs. 1 and 2. Another short transverse groove 14 is provided, in order that the line may be carried around the lower portion of the block, where an additional groove 15 is provided, so that the line may be contained within the plane of the lower surface of the block.

Extending from the central sight opening 16 of the block to the outside thereof is a hole 17, through which the line passes, in order to enable the free end thereof to be wrapped upon the holding pegs referred to. On the outer surface of the arms 5', there is arranged a cord grip 18 in the form of a spring, as shown, behind which the line may be caught and held, after it has been stretched between the two blocks, and through the twig holders, hereinafter described.

Each of the twig holders consists of a strip of metal of any suitable length, usually about five inches, said strip being adapted to be inserted between superimposed bricks of the wall being constructed, as shown in Fig. 5. Each twig holder 20 has the central portion thereof cut with parallel incisions to provide a tongue 21 which is bent, intermediate its ends, so as to embrace the line where it passes across the twig holder, and further bent to form an inclined portion which extends upward through the slot in the strip, caused by cutting the tongue therefrom, as clearly shown in Fig. 4.

In order to adapt the gage line to be used around a bay window, I employ a bay spike, illustrated in detail in Fig. 9, 22 designating the spike which, it will be observed, is pointed at one end, so that it may be readily driven or inserted in the mortar between the bricks, adjacent to the reëntrant angle at the side of the bay window, as illustrated in Fig. 8. This bay spike is provided with a bayonet slot 23, leading inward from one side edge thereof, so that the line 3 may be inserted readily therein, while secured to one of the side faces of the spike 22 is a spring clasp or grip 24, beneath which the cord may be clamped, in order to prevent the spike 22 from falling away from the cord, should the spike become loosened from its position, or at such times as the bay spike is not in use.

By now referring to Figs. 5, 6 and 8, it will be observed that the line blocks are arranged at opposite ends of the wall being constructed, and that the arms of the blocks which extend at right angles to each other are brought to bear against the front and end faces of the bricks at the corners of the wall. The twig holders are placed upon the upper tier of bricks and held in position by the weight of other bricks superimposed thereon, as clearly shown in the drawings. The line is now stretched taut between the end blocks, said line sliding easily through the twig holders. Should either one of the line blocks become dislodged from its place, it cannot fall, because the line is securely held by the adjacently located twig holder. On the other hand, should one of the twig holders become dislodged from its position, it cannot become lost for the reason that it is confined on the line by the spring 18. In like manner, should the bay spikes 22 become detached from the wall, they will be held on the line and prevented from escaping therefrom by reason of the slot 23 and the gripping portion 24. The device, as a whole, will be found extremely useful to brick-layers, as it may be quickly adjusted to place, and none of the parts thereof may become lost, for the reason that they are all interconnected with the line.

What is claimed is:

1. A line block, comprising arms set at a right angle to each other, one of said arms being provided in its face with line grooves at different elevations, and a cross groove connecting the first-mentioned grooves.

2. A line block, comprising a segmental body having an open center, and arms projecting from said body and set at a right angle to each other with their bearing faces terminating in the open center of the body, one of said arms having a line groove extending the entire length of its bearing face, a transverse line groove intersecting the first-mentioned groove and extending to one of the side faces of the arm, and cord fastening means on said block.

In testimony whereof I affix my signature in presence of two witnesses.

WILLIAM O. SMYTH.

Witnesses:
 ROBERT GILCHRIST,
 ROSS GILCHRIST.

---

Copies of this patent may be obtained for five cents each, by addressing the "Commissioner of Patents, Washington, D. C."